United States Patent Office 3,567,610
Patented Mar. 2, 1971

3,567,610
PRODUCTION OF CHLORINATED PARAFFINS
John E. Krol, Moon Township, and Albert J. Henderson, Coraopolis, Pa., assignors to Neville Chemical Company, Pittsburgh, Pa.
No Drawing. Filed June 24, 1968, Ser. No. 739,177
Int. Cl. C07c *17/10*
U.S. Cl. 204—163
25 Claims

ABSTRACT OF THE DISCLOSURE

Paraffin hydrocarbons are chlorinated in the presence of a minor amount of an additive capable of overcoming contamination present in the reaction zone which would otherwise retard the chlorination reaction. The additives utilized in the process are ferrocyanic acid, ferricyanic acid, and ferrocyanides or ferricyanides of ammonia, Group I metals, or Group II metals.

BACKGROUND OF INVENTION

The chlorination of higher paraffins, e.g. paraffins having at least about six carbon atoms per molecule, has long been known. Such chlorinated paraffins have found particular utility as plasticizers, as components of extreme pressure lubricants, and as flame-proofing, mold-proofing, and water-proofing agents. These products are commonly marketed in various forms depending upon their degree of chlorination which generally ranges up to about 70 percent chlorine by weight.

In many instances while utilizing prior art techniques there has been a marked tendency for the chlorination reaction to become retarded, or to cease prematurely, as the degree of chlorination increases. For instance, when one wishes to produce a product containing 70 percent chlorine by weight, the reaction may show signs of severe retardation when the hydrocarbon contains only about 40 to 60 percent chlorine by weight. Also, in some instances retardation in the rate of chlorine addition may begin as early as about 10 to 20 percent chlorine by weight because of contamination. Undesirable deposits may be formed upon the walls and other surfaces of the reaction zone, and contamination may cause an early darkening of the liquid phase. In a photochemical chlorination process such deposits may have particularly deleterious consequences as the light transmittance becomes reduced. In an effort to attain the desired degree of chlorination when the chlorination reaction has shown signs of retardation, one has heretofore been forced to resort to extended reaction periods, or to temporarily shut down the reaction so that the light source or other surfaces may be cleaned. Such corrective measures have not always proven effective since the desired degree of chlorination may never be accomplished, or the product when ultimately analyzed may be off-specification.

It is generally recognized that a primary cause for deposit formation and/or reaction retardation in the production of chlorinated paraffins may be traced to minor amounts of contamination present in the reaction system, e.g. iron contamination. Accordingly, iron contamination may enter the reaction zone in trace amounts with the feed or be unexpectedly derived from other sources and have a marked influence upon the course of the chlorination reaction. Ferric chloride is formed within the reaction zone because the presence of the three ingredients needed for its formation is practically unavoidable, i.e., HCl is a by-product of the reaction, and water and iron are difficult to eliminate at the low concentration levels which are sufficient to cause trouble. While it is possible to overcome this difficulty in some instances by elaborate reactant purification techniques, this solution to the problem is generally not practicable, and the added expense involved can seldom be justified.

As far back as 1942, Hull, in U.S. Pat. No. 2,403,179, col. 2, lines 23–26, and lines 29–33 describes a type of sludge produced by light of certain wavelengths, and the type of discoloration produced when iron reactors are used in the chlorination of hydrocarbons. Governale in U.S. Pat. No. 2,589,689, col. 1, lines 18–52, indicates that the impurities responsible for his difficulties may be traced to ferric chloride and that the reaction slows down because this compound or other sludge formed is able to foul the light transmitting surfaces of either the actinic light source or of the reaction vessel. Ziolkowski discusses in the American Institute of Chemical Engineers Journal, at pages 1025–8 (1967), some of the deleterious effects of wall deposits in the photochlorination of propane. Many of these harmful effects which may result during a chlorination reaction with or without the use of light are ameliorated to a large degree by use of the present invention.

It is an object of the invention to provide a chlorination process which is not deleteriously influenced by the presence of a minor amount of contamination.

It is an object of the invention to provide an improved process for the efficient production of chlorinated paraffins.

It is an object of the invention to provide a process capable of consistently forming a chlorinated paraffin product of good quality.

It is another object of the invention to provide a process which is capable of efficiently producing a chlorinated paraffin comprising up to about 70 percent chlorine by weight or more.

It is a further object of the invention to provide a process for production of chlorinated paraffins which will proceed smoothly to the desired degree of completion without the lapse of an inordinate period of time.

SUMMARY OF INVENTION

It has now been found that an improved process for the production of chlorinated paraffin hydrocarbons comprises chlorinating a paraffin hydrocarbon having at least six carbon atoms per molecule while in the liquid state in the presence of a minor amount of an additive which is soluble in water or hydrochloric acid selected from the group consisting of a ferrocyanide of a Group I or a Group II metal, a ferricyanide of a Group I or a Group II metal, ammonium ferrocyanide, ammonium ferricyanide, ferrocyanic acid, and ferricyanic acid to produce a chlorinated paraffin hydrocarbon having up to about 73 percent chlorine by weight or more.

DESCRIPTION OF PREFERRED EMBODIMENTS

The paraffin hydrocarbon which is chlorinated in accordance with the present process may be natural or synthetic in its origin and contain at least about six carbon atoms per molecule. Such hydrocarbons commonly contain about ten to about thirty or more carbon atoms per molecule and are mainly saturated straight chain hydrocarbons which range from liquids to solids at room temperature. The paraffin hydrocarbons having at least about seventeen carbon atoms per molecule tend to be solids at room temperature. It is preferred that the feed contain at least about 80 percent normal paraffin hydrocarbons by weight, and in a particularly preferred embodiment of the invention at least about 90 percent normal paraffins by weight are utilized. The higher the normal paraffin content the lighter the color and the higher the stability of the chlorinated paraffin product which is achievable. If desired, conventional molecular sieve techniques may be employed to obtain a feed of enhanced normal paraffin content.

Illustrative examples of the properties of suitable feeds for use in the process are summarized below:

| Property | Liquid Feed | Solid Feed |
|---|---|---|
| (1) Percent Normal Paraffins | 80% minimum | 80% minimum. |
| (2) Melting Point, °F | | 100–150. |
| (3) Boiling Range, °C | 65–300 | |
| (4) Carbon Number | 6–20 | 15–30. |
| (5) Specific Gravity | 0.660–0.790 at 60/60° F | 0.770–0.920 at 25/25° C. |
| (6) Refractive Index | 1.3750–1.4400 (at 25° C.) | 1.4200–1.4600 (at 60° C.). |
| (7) Saybolt Color | +20 to +30 | +20 to +30 (50/50 dilution). |

The percent unsaturated compounds in the paraffin feed should be low, and preferably not exceed about 0.5 percent by weight.

The additives utilized in the present process must be soluble to an appreciable degree in either water or hydrochloric acid and are selected from the ferrocyanides or ferricyanides of metals from Groups I and II, ferrocyanic acid, ferricyanic acid, ammonium ferrocyanide and ammonium ferricyanide. The particularly preferred additive for use in the process is potassium ferrocyanide, $$K_4Fe(CN)_6 \cdot 3H_2O,$$

which is sometimes identified as yellow prussiate of potash. Illustrative examples of other ferrocyanides which may be selected for use in the process include sodium ferrocyanide, $Na_4Fe(CN)_6 \cdot 10H_2O$, which is sometimes identified as yellow prussiate of soda; calcium ferrocyanide, $Ca_2Fe(CN)_6 \cdot 12H_2O$; magnesium ferrocyanide, $$MgFe(CN)_6 \cdot 12H_2O$$

and barium ferrocyanide, $Ba_2Fe(CN)_6 \cdot 6H_2O$. Illustrative examples of ferricyanides which may be used in the process include potassium ferricyanide, $K_3Fe(CN)_6$, which is sometimes identified as red prussiate of potash; sodium ferricyanide, $Na_3Fe(CN)_6 \cdot H_2O$, which is sometimes identified as red prussiate of soda; and calcium ferricyanide, $Ca_3[Fe(CN)_6]_2 \cdot 12H_2O$. Compounds which are capable of forming the ferrocyanides or ferricyanides in situ may also be utilized in the process. Mixtures of ferrocyanide and ferricyanide compounds may also be employed.

The chlorination reaction is conducted while the paraffin hydrocarbon is in the liquid state. Chlorine gas is reacted with the hydrocarbon by way of a conventional substitution reaction and hydrogen chloride is formed as a by-product. During the reaction the paraffin hydrocarbon may be present in its normally liquid state, as a melt, or dissolved in an organic solvent for the same. Preferably the viscosity of the liquid is sufficiently low to permit free evolution of hydrogen chloride so that the reaction may progress at a satisfactory rate.

When a product exhibiting a relatively low degree of chlorination is desired, e.g. up to about 40 percent chlorine by weight the use of a solvent may generally be avoided. By the elimination of a solvent from the system the effective capacity of the reaction vessel is increased and product recovery techniques are simplified. Also, whether the paraffin feed is a liquid or a wax will influence the possible use of an organic solvent. When both feeds are chlorinated to the same percentage of chlorine by weight, the product of the liquid paraffin feed tends to be less viscous, and accordingly the need to lower the viscosity of the reaction mixture through the use of a solvent is lesser.

In a preferred embodiment of the invention when one wishes to produce a product of relatively high chlorine content, e.g. about 55 to 73 percent by weight the paraffin hydrocarbon whether it be liquid or wax is dissolved in organic solvent which is inert in the sense that it does not interfere with the desired reaction and which also serves as a diluent during the chlorination reaction. Since the chlorination reaction is exothermal, the intimate presence of the solvent is helpful in maintaining the desired reaction temperature. If desired, a solvent may be selected having the requisite boiling point so that heat from the reaction zone may be withdrawn as the solvent is refluxed.

Preferred solvents are halogenated $C_1$ or $C_2$ hydrocarbons. For instance, carbon tetrachloride, chloroform, pentachloroethane, perchloroethylene, 1,1,1-trichlorethane, 1,1,2-trichlorethane, and ethylene dichloride, may serve this role. The particularly preferred solvent is carbon tetrachloride. Analogous chlorofluoroalkanes, hexachlorbutadiene, and any other solvent suitably inert under the reaction conditions may also be used as will be apparent to those skilled in the art.

In a preferred embodiment of the invention a $C_{20}$ to $C_{25}$ paraffin hydrocarbon is dissolved in a suitable solvent in a concentration of from about 15 to about 30 percent by weight of the total solution, and in a particularly preferred embodiment of the invention in a concentration of from about 20 to 25 percent by weight of the total solution. When paraffin hydrocarbons are chlorinated containing a lesser number of carbon atoms per molecule, the concentration of the paraffin in the solvent may be correspondingly higher. As indicated previously, it is not generally essential that any solvent be used if the paraffin is a liquid and one does not wish to produce a highly chlorinated product. Conversely, for paraffins containing a greater number of carbon atoms per molecule the concentration of the paraffin in the solvent may be correspondingly lower.

The present process may be employed for the chlorination of paraffin hydrocarbons with or without the utilization of light to catalyze the reaction. When one wishes to obtain a chlorinated paraffin product having more than about 50 percent chlorine by weight, then it is recommended that the reaction be catalyzed by light. If desired, the use of a light source may be deferred until a significant degree of chlorination is achieved, e.g. until the product contains about 40 to 45 percent chlorine by weight. Conventional actinic light sources commonly used in photochemical reactions may be selected from the following: fluorescent lamps, tungsten filament lamps, ordinary light bulbs, mercury vapor arc lamps such as a Hanovia light, and ultraviolet lamps. The light source may be placed directly inside the reactor, outside a transparent wall of the reactor, or next to a transparent external recycling line through which the reactants circulate.

It is known that light wavelengths below about 3000 angstrom units can produce harmful decomposition or an otherwise inferior product. Such wavelengths should be avoided, and may be filtered out or eliminated as disclosed in United States Patents Nos. 2,403,179 to Hull and 2,925,369 to Grabiel. Chlorination catalysts other than light are generally not used in the process.

The chlorination of paraffin hydrocarbons according to the present process is preferably conducted at relatively moderate temperatures such as about 20° C. to about 130° C. For instance, when a $C_{20}$ to $C_{25}$ paraffin hydrocarbon dissolved in carbon tetrachloride is chlorinated in the presence of a suitable light source, the chlorine gas and the hydrocarbon feed may be intimately admixed at room temperature. As the exothermal chlorination reaction progresses, the temperature of the reactants is desirably maintained below about 75° C., and preferably about 40° C. to about 70° C. Higher temperatures may be advantageously utilized in some instances, however, particularly when no solvent is employed, or when a solution of paraffin wax is chlorinated to a relatively high chlorine content. If reaction temperatures much above about 130° C. are encountered for an appreciable period of time, then an undesirable dark color and instability are commonly imparted to the chlorinated product. If reaction temperatures below about 20° C. are utilized, then the reaction rate tends to be unduly slow. The following techniques may be employed to moderate the exothermic portion of the reaction and to maintain the desired temperature: (1) refluxing the solvent with the concomitant removal of heat from the reaction mixture, (2) cooling the walls of the reactor, and (3) controlling the rate of chlorine introduction. The exact temperature selected for optimum results will be influenced by (1) the boiling range of the solvent, (2) the boiling range of the liquid paraffin, (3) and the relative concentration of the paraffin in a solvent.

The present process offers those practicing the same with an effective means to overcome difficulties presented by minor amounts of contaminants present in the chlorination zone, e.g. iron contamination, and more specifically ferric chloride contamination. The degree of chlorination may be varied as will be apparent to those skilled in the art, by controlling the total amount and the rate of chlorine introduced into the reaction zone. Chlorinated paraffins containing about 20 to about 73 percent chlorine by weight may be efficiently produced. The following chlorination periods are generally encountered in plant equipment to reach the desired degree of chlorination in accordance with the present invention:

Weight percent chlorine
present in chlorinated paraffin:        Time in hours
  40 ---------------------------------- 2 to 5
  50 ---------------------------------- 3 to 8
  60 ---------------------------------- 6 to 15
  70 ---------------------------------- 13 to 22

The advantages offered by the instant process are particularly marked in the production of a chlorinated hydrocarbon containing about 40 to about 73 percent chlorine by weight. It is within this range that there is commonly a significant tendency according to prior art chlorination techniques for the chlorination reaction to become retarded, and to sometimes cease if a minor amount of contamination is present within the chlorination zone. Chlorination times of 30 to 120 hours are common in the prior art. The present process overcomes this tendency, and enables the efficient formation of a highly chlorinated product. A significant time savings is accordingly offered. Outstanding results are achieved in the production of a chlorinated paraffin hydrocarbon having about 70 percent chlorine by weight. Additional advantages offered by the invention include the production of a product having improved color, and improved thermal stability against chemical breakdown and color darkening.

The theory by which the ferrocyanide or ferricyanide additives function in the chlorination process of the present invention is considered complex and incapable of simple explanation. Experience has indicated that the reaction slowdown encountered when one attempts to achieve a highly chlorinated paraffin may be traced to minute amounts of contamination present within the system. This harmful contamination may be attributed in large measure to iron compounds present with trace amounts of water within the system. Ferric chloride is believed to be a primary cause of the reaction difficulties encountered in the prior art. Iron in some form may be inadvertently introduced with the hydrocarbon feed, the chlorine gas, or be derived from the equipment employed in the process. Less objectionable iron contaminants which find their way into the reaction zone may then be converted to ferric chloride under the reaction conditions. It is believed that the ferrocyanide or ferricyanide additive serves to complex the contamination and convert the same to an innocuous form which does not appreciably impede the progress of the chlorination. It accordingly follows that even though the contaminants are present in the reaction zone, they no longer create process difficulties when intimately associated with a minor amount of the additive. The nature of the relatively small amount of complex which is formed is such that it does not react to produce additional sludge, and does not materially reduce light transmittance within the reaction zone.

A minor amount of the ferrocyanide or ferricyanide additive is preferably introduced into the reaction zone while dissolved in water or a dilute hydrochloric acid solution. Normally, less than 1 percent by weight of water is present in the chlorination zone, and preferably less than 0.05 percent by weight. The presence of the additive in dissolved form promotes its greater dispersion and a more intimate contact with the contaminant. However, if desired, the additive may be introduced into the chlorination zone in the form of a finely divided solid powder which may at least partially dissolve in the trace amount of moisture and hydrochloric acid present in the chlorination zone. The additive may be introduced into the chlorination zone incrementally, e.g. at the beginning of the chlorination and at 1 to 3 intervals spaced essentially uniformly throughout the course of the chlorination. If only two additions of additive are utilized, it is recommended that the first addition be at the beginning of the chlorination and the second addition be during the initial one-third of the time required to complete the desired degree of chlorination, or as a decrease in the rate of chlorination is noted. The number of additions of the additive may be influenced by the degree of contamination encountered in the particular batch and the corresponding retardation of chlorination which is exhibited.

The quantity of the additive may be calculated so that about 2 to 10, preferably about 3 to 5, gram moles of the additive are added to the chlorination zone for each 4 gram atoms of iron contamination present in the same. Commonly the ferrocyanide or ferricyanide additive is introduced in a total quantity amounting to about 0.1 to about 1000 parts per million based upon the weight of total charge, i.e. unchlorinated hydrocarbon plus solvent if any, and preferably in a total quantity of about 0.1 to 25 parts per million. Up to about 5 percent by weight or more of the additive may be utilized, but such a quantity generally is unnecessary to overcome amounts of contamination commonly encountered. When additions of the additive in excess of about 1 percent by weight are utilized, it is recommended that the additive be introduced as a finely divided easily filterable solid which remains at least partially dispersed throughout the reaction mixture as the chlorination reaction progresses. For instance, an additive having a particle size of about 10 to 15 mesh may be utilized. When the reaction is terminated the solid may be optionally recovered in whole or in part by filtration or any other suitable means.

Conventional apparatus commonly utilized in the chlorination of paraffin hydrocarbons may be selected for use in the present process which are provided with means for passing gaseous chlorine into the paraffin hydrocarbon. Such vessels are preferably glass lined, or lined with some other non-ferrous material so as to minimize iron contamination as much as practicable. During the reaction the paraffin hydrocarbon is preferably agitated while in the liquid state and chlorine gas is continuously or intermittently introduced. Generally, chlorine is introduced into the liquid paraffin hydrocarbon so that the total quantity added is about 100 to 160 percent of the theoretical quantity, and preferably about 100 to 115 percent of the theoretical quantity. As indicated previously, a solvent present with the paraffin hydrocarbon feed may be optionally refluxed and returned to the chlorination zone. Also, a recycle of the reaction mixture may prove advantageous to promote the requisite intimate contact of reactants. If desired, an actinic light source capable of producing a photochemical reaction may be positioned within a conventional Pyrex sleeve or a quartz well for the same situated within the main vessel or next to a transparent recycle line.

At the completion of the chlorination standard techniques may be employed to recover the chlorinated paraffin at a relatively high degree of purity. For instance, air or other gas may be blown through the reaction mixture to remove unreacted chlorine and remaining hydrogen chloride by-product resulting from the replacement reaction. Also, remaining hydrogen chloride may be neutralized in situ by contact with a base which will not deleteriously alter the chlorinated paraffin. Any solvent or diluent may be readily removed by vacuum or steam distillation. Conventional stabilizers such as, ethylene glycol, phosphates, dibasic lead phosphites, tribasic lead maleate monohydrate, triethanolamine, organo metallic compounds of tin, epoxidized soya or linseed oils, polyallyl glycidyl ethers, or blends of the foregoing may be blended with the chlorinated paraffin product to protect it from undue dehydrochlorination during storage and subsequent use particularly if elevated temperatures are encountered for extended periods of time. Generally, the addition of up to about 5.0 percent stabilizer by weight is satisfactory. However, this amount may be adjusted depending upon the temperatures encountered and length of exposure to light or heat.

The chlorinated paraffins produced in accordance with the present invention range from viscous liquids to low-melting often resinous solids. Any particular sample may contain tens, or even hundreds of different molecular species. Their specific gravity, viscosity, and melting point generally increase with increased chlorine content. They are characterized by general nontoxicity and nonflammability and are soluble in a wide range of industrial solvents, such as chlorinated solvents, ether, ketones, benzene, etc. They are generally not soluble in lower alcohols, glycols, glycerine, or water.

When producing a solid chlorinated paraffin at the approximately 70 percent chlorine level, the following properties must generally be exhibited to establish the product as being of premium quality:

Ring and ball SP, ° C.—90–100
Color, Gardner [1]—2 (max.)
Percent chlorine—69.0 (min.)
Sp. Gr. at 25/25° C.—1.60 (min.)
Heat stability (JQD)[2]—0.3% HCl (max.)

[1] 15 grams in 100 ml. $CCl_4$. Use Gardner Standard Color Scale.
[2] J.Q.D. measures the percent by wt. of free HCl given off by a sample of chlorinated paraffin heated to 175° C. and held for 4 hours.

The following examples are given as specific illustrations of the invention, It should be understood, however, that the invention is not limited to the specific details set forth in the examples.

EXAMPLE I

The invention

Three thousand parts by weight of commercially available paraffin wax having the following specification was charged to a glass lined reaction vessel in molten form:

| | |
|---|---|
| Saybolt color | +28 to +30 |
| Melt point, ° F. | 129 to 130.5 |
| Percent oil | 0.8 to 1.2 |
| Sp. Gr. at 60/60° F. | 0.917 to 0.927 |
| Visc., SSU at 210° F. | 36.3 to 36.9 |
| Refractive Index at 60° C. | 1.4260 to 1.4270 |
| Composition, percent: | |
| n-Paraffins | 93.1 to 98.0 |
| Aromatics | 0.2 to 0.3 |
| Olefins | Trace |

The hydrocarbon feed consisted predominantly of hydrocarbons having about 20 to about 26 carbon atoms per molecule. Next, 10,000 parts by weight of technical grade carbon tetrachloride were charged to the reaction vessel. With the aid of a propeller stirrer the paraffin wax was completely dissolved within the carbon tetrachloride. The resulting reaction mixture contained about 0.4 p.p.m. of iron based on the weight of the total charge. The reaction vessel was provided with a Pyrex glass recycle line whereby a portion of the reactants could be continuously withdrawn from a lower portion of the reaction vessel and reintroduced at the top thereof. Situated next to the recycle line was a mercury vapor arc lamp.

Finely divided potassium ferrocyanide in a quantity of 0.035 part by weight was dissolved in 1.1 part by weight of water and added to the reaction vessel while agitation continued. The temperature of the contents of the reaction vessel was 66° C. The light source was actuated, the recycle was begun, and chlorine gas was continuously introduced into the recycle line at a rate of 1000 parts of chlorine per hour. When the degree of chlorination reached 64 percent by weight based upon the weight of the chlorinated product, the rate of chlorine introduction is reduced to 500 parts of chlorine per hour. Further additions of like quantities of the aqueous potassium ferrocyanide solution were not required. The carbon tetrachloride solvent was under reflux as the exothermic reaction progressed and the reactants were prevented from attaining a temperature in excess of about 70° C. by refluxing the carbon tetrachloride and additional water cooling of the reaction vessel. After 4 hours the chlorinated paraffin hydrocarbon contained approximately 40 percent chlorine by weight. After 5¼ hours the chlorinated paraffin hydrocarbon contained approximately 50 percent chlorine by weight. After 20¾ hours the chlorinated paraffin hydrocarbon contained approximately 70 percent chlorine by weight and the chlorination was terminated. Upon recovery the chlorinated paraffin hydrocarbon was found to exhibit the following properties:

Ring and ball SP,° C.—92
Color, Gardner—1
Percent chlorine—71.7
Sp. Gr. at 25/25° C.—1.62
Heat stability (JQD)—0.15% HCl The prior art The advantage afforded by the present invention is illustrated by comparing the run described above with a similar chlorination conducted in the absence of any added ferrocyanide. More specifically, 1600 parts by weight of the same paraffin wax used before was dissolved in 8000 parts by weight of carbon tetrachloride and chlorinated according to the procedure described in the first part of this example, except that no potassium ferrocyanide was added. After 3 hours the resulting chlorinated paraffin hydrocarbon contained approximately 40 percent chlorine by weight. After 4½ hours the resulting chlorinated paraffin hydrocarbon contained approximately 50 percent chlorine by weight. However, 33¾ hours were required in order to obtain a chlorinated product containing approximately 67 percent chlorine by weight. The properties of the chlorinated product were as follows:

Ring and ball SP, ° C.—87
Color, Gardner—7
Percent chlorine—67.2
Sp. Gr. at 25/25° C.—1.57
Heat stability (JQD)—1.02% HCl In still another identical companion run conducted in the absence of potassium ferrocyanide the chlorination reaction ceased after 40 hours and the product contained only about 65 percent chlorine by weight. The properties of this product were as follows:

Ring and ball SP, ° C.—81
Color, Gardner—4
Percent chlorine—64.8
Sp. Gr. at 25° C.—1.556
Heat stability (JQD)—0.59% HCl It will be noted from the above chlorination reactions that the present invention offers an efficient process which is particularly suited for the production of a premium quality highly chlorinated product within a shorter reaction period than would otherwise be possible.

EXAMPLE II

Example I may be repeated while substituting a potassium ferricyanide additive for the potassium ferrocyanide additive to obtain similar results.

EXAMPLE III

Example I may be repeated while substituting a sodium ferrocyanide additive for the potassium ferrocyanide additive to obtain similar results.

EXAMPLE IV

Example I may be repeated while substituting a sodium ferricyanide additive for the potassium ferrocyanide to obtain similar results.

Chlorinated paraffins formed according to the present invention may be used as plasticizers for vinyl polymers and copolymers, polystyrene, methyl methacrylate, coumarone-indene resins, chlorinated rubber and for neoprene rubber; as components of extreme pressure lubricants; and in the paint and varnish industry in the compounding of fire-resistant and marine paints. Highly chlorinated paraffins formed according to the invention are used in the manufacture of dielectric fluids and insulating covering materials for electrical conductors; and in the fireproofing, mold-proofing and water-proofing of cotton, canvas, ropes, and other textile materials.

Although the invention has been described with preferred embodiments, it is to be understood that variations and modifications may be restorted to as will be apparent to those skilled in the art. Such variations and modifications are to be considered within the purview and the scope of the claims appended hereto.

We claim:

1. Process for the production of chlorinated paraffin hydrocarbons comprising chlorinating a paraffin hydrocarbon having at least about six carbon atoms per molecule while in the liquid state in the presence of iron contamination and in the presence of a minor amount of an additive which is soluble in water or hydrochloric acid and is selected from the group consisting of ferrocyanides of Group I and Group II metals, ferricyanides of Group I and Group II metals, ammonium ferrocyanide, ammonium ferricyanide, ferrocyanic acid, and ferricyanic acid to produce a chlorinated paraffin hydrocarbon having about 20 to about 73 percent chlorine by weight.

2. A process according to claim 1 in which said paraffin hydrocarbon contains about 10 to about 30 carbon atoms per molecule.

3. A process according to claim 1 in which the paraffin hydrocarbon contains at least about 80 percent normal paraffins by weight.

4. A process according to claim 1 in which said paraffin hydrocarbon is dissolved in an inert organic solvent for the same.

5. A process according to claim 4 in which said organic solvent is carbon tetrachloride.

6. A process according to claim 1 in which said additive is potassium ferrocyanide.

7. A process according to claim 1 in which said additive is potassium ferricyanide.

8. A process according to claim 1 in which said additive is sodium ferrocyanide.

9. A process according to claim 1 in which said additive is sodium ferricyanide.

10. A process according to claim 1 in which the additive is introduced while dissolved in an aqueous solution.

11. A process according to claim 1 which the additive is introduced as a finely divided solid.

12. Process for the production of chlorinated paraffin hydrocarbons comprising chlorinating at a temperature of about 20° C. to about 130° C. a paraffin hydrocarbon having about 10 to about 30 carbon atoms per molecule while dissolved in an inert organic solvent for the same in the presence of iron contamination and in the presence of about 0.1 to about 1000 parts per million based on the weight of the total charge of an additive which is soluble in water or hydrochloric acid and is selected from the group consisting of ferrocyanides of Group I and Group II metals, ferricyanides of Group I and Group II metals, ammonium ferrocyanide, ammonium ferricyanide, ferrocyanic acid, and ferricyanic acid to produce a chlorinated paraffin hydrocarbon having about 40 to about 73 percent chlorine by weight.

13. A process according to claim 12 in which said additive is present in a concentration about 0.1 to about 25 parts per million based on the weight of the total charge.

14. A process according to claim 12 in which said paraffin hydrocarbon contains at least about 80 percent normal paraffins by weight.

15. A process according to claim 12 in which said organic solvent is carbon tetrachloride.

16. A process according to claim 12 in which said additive is potassium ferrocyanide.

17. A process according to claim 12 in which said additive is potassium ferricyanide.

18. A process according to claim 12 in which said additive is sodium ferrocyanide.

19. A process according to claim 12 in which said additive is sodium ferricyanide.

20. A process according to claim 12 in which said paraffin hydrocarbon is a normally solid paraffin wax containing at least about 17 carbon atoms per hydrocarbon molecule and in which chlorine gas is mixed with the dissolved hydrocarbon.

21. Process for the production of chlorinated paraffin hydrocarbons comprising chlorinating at a temperature of about 20° C. to about 130° C. a paraffin hydrocarbon having about 10 to about 30 carbon atoms per molecule while dissolved in inert organic solvent for the same in the presence of iron contamination and in the presence of about 0.1 to about 25 parts per million based on the weight of the total charge of intimately dispersed potassium ferrocyanide to produce a chlorinated paraffin hydrocarbon having about 70 percent chlorine by weight.

22. A process according to claim 21 in which said paraffin hydrocarbon contains at least about 80 percent normal paraffins by weight.

23. A process according to claim 21 in which the organic solvent is carbon tetrachloride.

24. In a process for the production of chlorinated paraffin hydrocarbons containing between about 55 and about 73 percent by weight of chlorine by passing chlorine gas through a liquid reaction mixture containing about 15 to 30 percent by weight of a predominantly straight chain paraffin dissolved in carbon tetrachloride at a temperature below about 75° C. in the presence of an iron contaminant and in the presence of light, the improvement which comprises adding to said reaction mixture an aqueous solution of potassium ferrocyanide in a proportion to provide between about 3 and 5 gram moles per 4 gram atoms of iron contaminant present in the mixture.

25. A process according to claim 24 where said predominantly straight chain paraffin is a wax consisting predominantly of hydrocarbons containing between about 20 and about 26 carbon atoms per molecule and in which chlorine is passed through the reaction mixture until a chlorinated wax containing about 70 percent chloride by weight is produced.

References Cited

UNITED STATES PATENTS 2,403,179   7/1946   Hull et al. _____ 260—660(X)

BERNARD HELFIN, Primary Examiner

J. A. BOSKA, Assistant Examiner

U.S. Cl. X.R.

260—660